(12) United States Patent
Suhara et al.

(10) Patent No.: US 6,379,402 B1
(45) Date of Patent: Apr. 30, 2002

(54) METHOD FOR MANUFACTURING LARGE-CAPACITY ELECTRIC DOUBLE-LAYER CAPACITOR

(75) Inventors: Manabu Suhara; Kazuya Hiratsuka, both of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/554,323

(22) PCT Filed: Sep. 13, 1999

(86) PCT No.: PCT/JP99/04983

§ 371 Date: May 12, 2000

§ 102(e) Date: May 12, 2000

(87) PCT Pub. No.: WO00/16354

PCT Pub. Date: Mar. 23, 2000

(30) Foreign Application Priority Data

Sep. 14, 1998 (JP) .......................................... 10-260454

(51) Int. Cl.⁷ .............................. H01L 9/00; H01L 9/10; B05D 5/12
(52) U.S. Cl. ...................... 29/25.03; 361/502; 361/503; 361/518; 427/80
(58) Field of Search ............................. 29/25.01–25.03, 29/25.41–25.42, 623.1, 623.2; 361/502–505, 511, 512, 518; 427/79, 80

(56) References Cited

U.S. PATENT DOCUMENTS 4,725,927 A * 2/1988 Morimoto et al. .......... 361/433
5,450,279 A * 9/1995 Yoshida et al. ............. 361/502
6,104,600 A * 8/2000 Suhara et al. .............. 361/502

FOREIGN PATENT DOCUMENTS

| JP | 5-343263 | * | 12/1993 |
| JP | 7-22295 | * | 1/1995 |
| JP | 9-162082 | * | 6/1997 |
| JP | 10-41199 | * | 2/1998 |
| JP | 11-87195 | * | 3/1999 |

* cited by examiner

*Primary Examiner*—Ha Tran Nguyen
(74) *Attorney, Agent, or Firm*—Oblon, Spivak, McClelland, Maier & Neustadt, P.C.

(57) ABSTRACT

This relates to a process for producing an electric double layer capacitor having a low resistance and a large capacitance of at least 10F, and it is an object to provide a process for producing a large capacitance electric double layer capacitor showing little self-discharge, little deterioration with time of the capacitance or little deformation of the cell. The above object is accomplished by forming an element by disposing a positive electrode and a negative electrode made mainly of a carbon material having a specific surface area of at least 500 $m^2/g$ to face each other with a separator interposed, impregnating it with a non-aqueous electrolyte, applying a voltage of from 1 to 1.5 times the rated voltage in a non-sealed state, further maintaining the element under reduced pressure and sealing a container accommodating the element.

36 Claims, No Drawings

METHOD FOR MANUFACTURING LARGE-CAPACITY ELECTRIC DOUBLE-LAYER CAPACITOR

BACKGROUND OF THE INVENTION

1. Field of the Invention

The present invention relates to a process for producing an electric double layer capacitor having a low resistance and a large capacitance of at least 10 F.

2. Discussion of the Background

A conventional low resistance large capacitance electric double layer capacitor for power application is such that a pair of strip electrodes each having a thin film polarizable electrode material made mainly of active carbon powder formed on a current collector, are wound with a separator interposed, to form an element, this element is impregnated with an electrolyte and accommodated in a bottomed cylindrical metal container, and an opening of the container is sealed with a sealing member. Further, JP-A-4-154106 discloses an electric double layer capacitor wherein rectangular positive electrode and negative electrode each having a polarizable electrode formed on each side of a current collector, are alternately laminated in plurality with a separator interposed to form an element, the element is accommodated in an angular container, and the element is impregnated with an electrolyte and sealed by a sealing cover. For the electrodes of these electric double layer capacitors, activated carbon having a large specific surface area, is employed.

With conventional electric double layer capacitors employing activated carbon, a usual withstand voltage per unit element is from about 2.0 to 2.8 V in the case of electric double layer capacitors employing a non-aqueous electrolyte, although it may depend also on the selection of the solvent and the solute to be used. The energy is proportional to the square of the voltage. Accordingly, it is desired to increase the output density by increasing the energy density by improvement of the durability against application of a high voltage and by an increase of the capacitance density and by lowering the internal resistance, so that a larger quantity of energy can be taken out rapidly. Further, from the viewpoint of the energy storage, it is desired to improve the voltage-holding property after charging.

JP-A-7-022295 discloses that in a process for producing a coin-shaped electric double layer capacitor employing a non-aqueous electrolyte, a voltage of 2 V is preliminarily applied prior to sealing the container, whereby it is possible to suppress an increase of the thickness of the cell or an increase of the internal resistance with time, even if a voltage of 2 V is applied during charging. However, this electric double layer capacitor has a high internal resistance and a small capacitance, and further the voltage-holding property is also inadequate, and as such, it can not be applied to power application.

Further, JP-A-5-343263 discloses that polarizable electrodes are impregnated with a sulfuric acid electrolyte, a voltage of 1 V is preliminarily applied, then an inert gas is injected, followed by sealing, whereby it is possible to reduce the internal resistance and leakage current and to increase the capacitance. However, this electric double layer capacitor employs an aqueous electrolyte, whereby the useful voltage of a unit element is 1 V at the highest, the energy density is low and the voltage-holding property is inadequate, and therefore it is hardly applicable to power application.

Whereas, in JP-A-10-41199, the present inventors have proposed a method for obtaining a large capacitance electric double layer capacitor which is excellent in the voltage-holding property and which exhibits little decrease with time of the capacitance, by preliminarily applying a voltage slightly higher than the rated voltage.

Heretofore, to increase the capacitance of an electric double layer capacitor, activated carbon having a larger specific surface area has been employed, but there has been a problem that when a high voltage is applied, a gas is likely to be generated by decomposition of the surface functional groups of activated carbon or the solvent of the electrolyte, or by decomposition of impurities contained in a small amount in the capacitor cell. According to the method disclosed in JP-A-10-41199, a gas can be generated prior to the use of the electric double layer capacitor by a preliminary application of a voltage, and this gas can be discharged out of the capacitor container. However, if it is used for a long period of time by applying a voltage continuously for e.g. a few thousands hours, a gas will gradually be generated, to increase the inner pressure of the container, and especially when a readily deformable container such as angular container is employed, there will be a problem that the container tends to swell. Accordingly, it is necessary to take a deformation of the container into consideration, when a module is to be constituted by means of a plurality of capacitors.

Accordingly, it is an object of the present invention to provide a large capacitance electric double layer capacitor having a high withstand voltage, whereby the container is hardly deformable, and the performance is constant even when it is used for a long period of time.

SUMMARY OF THE INVENTION

The present invention provides a process for producing a large capacitance electric double layer capacitor, which comprises a step of forming an element by disposing a positive electrode and a negative electrode containing a carbon material having a specific surface area of at least 500 $m^2/g$ to face each other with a separator interposed, a step of impregnating the element with a non-aqueous electrolyte and then applying an applied voltage of from 1 to 1.5 times the rated voltage across the positive electrode and the negative electrode, a step of maintaining the element under a reduced pressure, a step of accommodating the element in a metal container, and a step of sealing the metal container.

DESCRIPTION OF THE PREFERRED EMBODIMENTS this specification, the rated voltage is the maximum working voltage allowable for the guaranteed life as an electric double layer capacitor in a usual working condition. When the rated voltage is not prescribed for a product, a voltage is applied to the electric double layer capacitor at 60° C. for 1000 hours, whereby the maximum voltage at which the volume change can be controlled within 30%, is taken as the rated voltage. Further, in this specification, the element represents one having a positive electrode and a negative electrode facing each other with a separator interposed, which is accommodated in one container for electric double layer capacitor. For example, in a case where a positive electrode and a negative electrode are accommodated in a container as alternately laminated in plurality with a separator interposed, the entire laminate is called an element.

In the process of the present invention, the applied voltage to the element is from 1 to 1.5 times the rated voltage of the electric double layer capacitor. If it is less than 1 time, the effect for improving the voltage holding property is little as compared with a case where no applied voltage is applied, and if it exceeds 1.5 times, the initial capacitance tends to be low, or the internal resistance tends to increase. Preferably, it is from 1 to 1.15 times, particularly preferably from 1.03 to 1.12 times.

The above application of the voltage is preferably carried out at a temperature of from 35 to 85° C. When the voltage is applied while heating, the effect for improving the voltage-holding property increases, whereby the time for applying the voltage can be shortened. If it is lower than 35° C., the heating effect is small, and if it exceeds 85° C., the initial capacitance tends to be low, and the internal resistance tends to increase. Particularly preferred is from 50 to 70° C.

The time for applying the above voltage is preferably at least 2 hours, usually from 5 to 100 hours. If the time for application of the voltage is short, the voltage-holding property can not be increased, and the amount of gas generated during use tends to be large, whereby swelling of the capacitor container tends to increase. On the other hand, if the time for application of the voltage is long, the productivity for the electric double layer capacitor tends to be poor.

If the voltage is applied in the production process as in the present invention, gases such as CO, $CO_2$ and $H_2$ will be generated in the case of an electric double layer capacitor using a usual carbon material having surface functional groups, such as activated carbon having a high specific surface area, for electrodes, and a non-aqueous electrolyte. Such gases are believed to be formed by decomposition of the surface functional groups of the carbon material or the solvent of the electrolyte, or by the decomposition of impurities contained in a small amount in the cell. The generated gases, such as $CO_2$ gas, will be dissolved in the electrolyte, but if a gas which can not be fully dissolved, or a gas which can not be dissolved, is present, the inner pressure of the capacitor container will increase, and consequently, the container will be swelled. Therefore, in the present invention, it is preferred to apply the voltage to the element in a non-sealed state.

In the present invention, the capacitor element is maintained under a reduced pressure usually after the step of applying the voltage. Specifically, a container having the capacitor element accommodated therein, is brought to be under a reduced pressure. Here, the container may be a metal container for an electric double layer capacitor or other container capable of accommodating a capacitor element. When other container is to be used, a plurality of elements may be simultaneously maintained under a reduced pressure in one container.

By maintaining the element under a reduced pressure, the gas which can not fully be dissolved in the non-aqueous electrolyte will be purged from the capacitor element and out of the container accommodating the element. At that time, a gas present in voids of the electrodes or in voids of the separator will also be purged. At the same time, a gas such as $CO_2$ dissolved in the electrolyte can also be purged, whereby no substantial gas may remain as dissolved in the electrolyte.

The majority of the gas generated during the use of the electric double layer capacitor is $CO_2$ gas, which can be dissolved in the non-aqueous electrolyte. Accordingly, if the above application of the voltage and maintenance of the element under a reduced pressure are carried out, even if a gas is generated again during the use while the interior of the capacitor container is made to be the atmospheric pressure, this gas will firstly be dissolved in the electrolyte. Namely, when an electric double layer capacitor prepared by the process of the present invention, is used, even if a small amount of a gas is generated, an increase of the internal pressure of the container may be negligible, and the container will not be swelled. Accordingly, even if the electric double layer capacitor is used for a long period of time, the internal pressure scarcely increases, and the container will scarcely be swelled.

In the present invention, the interior of the container accommodating the capacitor element is preferably made to be under a reduced pressure of at most 160 mmHg, in order to maintain the above-mentioned reduced pressure. If the pressure is not sufficiently reduced, the gas dissolved in the electrolyte can not be purged. It is particularly preferred to bring the interior to a reduced pressure of at most 10 mmHg. Further, the time for maintaining it under a reduced pressure is preferably from 5 to 120 minutes, so that the gas dissolved in the electrolyte will sufficiently be purged.

Further, in the present invention, the step of applying an applied voltage of from 1 to 1.5 times the rated voltage across the positive electrode and the negative electrode and the step of maintaining the element under a reduced pressure, may be carried out simultaneously in one step. Namely, an impressed voltage may be applied to the element under a reduced pressure. By this method, the gas will be removed out of the element as it is generated.

In the present invention, it is preferred that after maintaining the electric double layer capacitor element under a reduced pressure, the pressure in the interior of the metal container is adjusted to be the atmospheric pressure at the stage of sealing the metal container having the element accommodated therein. The interior of the metal container may not completely be the atmospheric pressure so long as it is adjusted to be substantially the atmospheric pressure. Even when the element is accommodated in the metal container and maintained to be under a reduced pressure, it is preferred to bring the interior of the container to be substantially the atmospheric pressure by injecting an inert gas which does not dissolve in the non-aqueous electrolyte and which does not react with the electrodes. In order to seal the container while maintaining the interior of the container under a reduced pressure, a complex sealing installation will be required, and a complex production process will be required.

For the electric double layer capacitor in the present invention, a non-aqueous solvent is used as the solvent for the electrolyte in order to increase the withstand voltage. Specifically, at least one solvent selected from the group consisting of propylene carbonate, ethylene carbonate, butylene carbonate, diethyl carbonate, dimethyl carbonate, ethylmethyl carbonate, 1,2-dimethoxyethane, sulfolane and methylsulfolane, is preferred from the viewpoint of the chemical and electrochemical stability, the electrical conductivity and the low temperature characteristics. Among them, when a carbonate type solvent is used mainly, the effects of the present invention will be large.

Further, the solute of the electrolyte is preferably a salt having a quaternary ammonium ion of the formula $R^1R^2R^3R^4N^+$ or a quaternary phosphonium ion of the formula $R^1R^2R^3R^4P^+$ (wherein each of $R^1$, $R^2$, $R^3$ and $R^4$ which are independent of one another, is a $C_{1-4}$ alkyl group) combined with an anion of $BF_4^-$, $N(CF_3SO_2)_2^-$, $PF_6^-$ or $ClO_4^-$. Specifically, $(C_2H_5)_3(CH_3)NBF_4$, $(C_2H_5)_4NBF_4$ or $(C_2H_5)_3(CH_3)PBF_4$ is, for example, preferred.

When the above-described electrolyte is used, the withstand voltage of the electrolyte is high, whereby the rated voltage can be made to be from 2.5 to 3.3 V. And, the impressed voltage to be applied in the production process to an element of an electric double layer capacitor having a rated voltage within this range, is preferably from 2.5 to 3.5 V.

The electrodes of the electric double layer capacitor in the present invention are electrodes containing a carbon material having a specific surface area of at least 500 $m^2/g$ with respect to both the positive electrode and the negative electrode. As such a carbon material, activated carbon, polyacene or carbon black may, for example, be specifically mentioned, and it is particularly preferred that the electrode is composed of activated carbon, a conductive material such as carbon black which imparts electrical conductivity and a binder, and it is bonded to a metal current collector. Such an electrode may be formed, for example, in such a manner that a certain solvent is added and mixed to the carbon material, the carbon black and the binder to obtain a slurry, which is coated or impregnated to the metal current collector, followed by drying and, if necessary by pressing to integrate it with the current collector.

The above carbon material is particularly preferably such that the average particle size is at most 30 $\mu m$, and the specific surface area is from 1,200 to 3,000 $m^2/g$, whereby the capacitance of an electric double layer capacitor can be made large, and the internal resistance can be made low.

As the binder to be contained in the electrodes, polyvinylidene fluoride, a copolymer comprising polymer units based on a fluoroolefin and polymer units based on other monomer, carboxymethyl cellulose, polyvinylpyrrolidone, polyvinyl alcohol, polyacrylic acid or polyimide, is, for example, preferred. A crosslinking agent, etc., may further be added, as the case requires. Further, as the solvent for the slurry, one capable of dissolving the binder is preferred, and n-methylpyrrolidone, water, dimethylformamide, toluene, xylene, methyl ethyl ketone, ethyl acetate, methyl acetate, dimethyl phthalate, ethanol, methanol or butanol, may, for example, be mentioned.

Further, a method is also preferred wherein the carbon material, the conductive material powder and a fluorine resin powder such as polytetrafluoroethylene, as the binder, are kneaded by an addition of a solvent, followed by rolling to obtain a sheet, which is electrically bonded to a metal current collector via a conductive adhesive, to form an electrode. If an electrode obtainable by this method is employed, it is possible to obtain an electric double layer capacitor having a high capacitance density, such being preferred.

In the present invention, in order to obtain an electric double layer capacitor having a large capacitance of at least 10 F, a structure capable of enlarging the electrode area is preferred, such as a cylindrical type wherein a pair of strip electrodes are wound to face each other with a separator interposed, and accommodated in a cylindrical container, or an angular type wherein a plurality of positive electrodes and negative electrodes are alternately laminated with a separator interposed to form an element, which is accommodated in an angular container.

The metal current collector to be electrically connected with the electrode may be one which is resistant to the electrolyte, and for example, stainless steel or aluminum is preferably employed. The shape of the metal current collector may be any shape such as a foil-shape, an expanded metal-shape, a fiber-sintered sheet shape or a plate metal foam. Among them, a current collector made of an aluminum foil having a thickness of from 20 to 100 $\mu m$ is preferred, since the winding or laminating step is easy. When a metal foil is used for a current collector, it is particularly preferred to roughen the surface by chemical, electrochemical or physical etching, whereby adhesion between the activated carbon electrode layer and the metal foil will be improved, and the electrical resistance can be made low.

In the present invention, as the separator to be interposed between the positive electrode and the negative electrode, a glass fiber mat, a cellulose paper made of manila hemp or craft, a hydrophilic porous polytetrafluoroethylene film or a polypropylene non-woven fabric may, for example, be mentioned. Further, as the container to be used in the present invention, a metal container made of aluminum, stainless steel, iron or an alloy thereof, is particularly preferred.

In the present invention, it is preferred that by using preliminarily heated and dried sheet-form electrodes as the positive electrode and the negative electrode, the positive electrode and the negative electrode are wound or laminated to face each other with a separator interposed to form an element, which is vacuum-dried at a temperature of from 120 to 250° C. to remove a volatile component such as moisture in the element, and then the electrolyte is vacuum-impregnated. It is preferred to adjust the ambient temperature during impregnation at a level of from 40 to 80° C., whereby the viscosity of the electrolyte will be low, and the electrolyte will readily be impregnated to the electrodes. The impregnation of the electrolyte may be carried out either after accommodating the element in the metal container or prior to accommodating the element in the metal container.

Now, the present invention will be specifically described with reference to Working Examples (Examples 1 and 2) and Comparative Examples (Examples 3 to 6). However, the present invention is not limited thereto.

EXAMPLE 1

Ethanol was added to a mixture comprising 80 wt % of activated carbon powder (specific surface area: 1600 $m^2/g$, average particle size: 6 $\mu m$) obtained by KOH activation treatment of a phenol resin, 10 wt % of ketjenblack EC and 10 wt % of a polytetrafluoroethylene powder, followed by kneading, forming into a sheet shape and drying to obtain a sheet having a thickness of 0.2 mm. This sheet was bonded to each side of an aluminum foil having a thickness of 40 $\mu m$ via a conductive adhesive containing fine powder of graphite, followed by heat treatment for drying to obtain an electrode having an effective electrode surface of 10 cm×7 cm, which was used as a positive electrode and a negative electrode. Further, at the upper end of this electrode, a lead portion having a width of 2.5 cm and a length of 4 cm, was provided. However, for the electrodes at both ends, the electrode sheet was bonded only on one side facing the counter electrode.

Then, 21 sheets each of the positive electrodes and the negative electrodes were alternately laminated with a glass fiber mat separator having a thickness of 160 $\mu m$ interposed, to form an element. The positive electrode leads and the negative electrode leads were respectively bundled and supersonically bonded to the positive electrode terminal and the negative electrode terminal, respectively, attached to a rectangular aluminum top cover having an injection hole for an electrolyte. At both ends of the element, insulating resin plates were disposed, and the element was accommodated in a bottomed angular aluminum container having a height of 130 mm, a width of 82 mm and a thickness of 30 mm and made of an aluminum sheet having a thickness of 0.7 mm. The above top cover was fit in an opening of the aluminum container, and the contact portion was welded by laser.

The above element was vacuum-dried at 180° C. for 16 hours in a state where the injection hole was open, and volatile impurities were removed. Thereafter, an electrolyte of a propylene carbonate solution in a dry air atmosphere having a dew point of at most −50° C. and containing 1.5 mol/l of $(C_2H_5)_3(CH_3)NBF_4$, was vacuum impregnated from the injection hole to this element at 50° C. Then, across the positive electrode terminal and the negative electrode terminal, a DC voltage of 2.6 V was applied for 20 hours at 70° C., and then the injection hole was connected to a vacuum pump, and the interior of the container was made to be a reduced pressure condition of 0.5 mmHg, and maintained under such condition for 15 minutes. Then, $N_2$ gas was injected into the container from the injection hole to bring the interior of the container to be the atmospheric pressure, whereupon a safety valve was attached to the injection hole to seal the container, to obtain an angular electric double layer capacitor having a capacitance of 2500 F and a rated voltage of 2.5 V.

This electric double layer capacitor was charged with the rated voltage, whereby the ratio of the capacitance after continuously applying the rated voltage at 60° C. for 3000 hours, to the initial capacitance, was taken as the capacitance-holding ratio (%). The capacitance-holding ratio of this capacitor was 87%. At the center portion of the container, the thickness was found to have increased by 0.6 mm at the maximum.

EXAMPLE 2

N-methylpyrrolidone was added to a mixture comprising 78 wt % of activated carbon power (specific surface area: 1500 $m^2/g$, average particle size: 3 μm) obtained by steam activation treatment of a phenol resin, 14 wt % of ketjenblack EC and 8 wt % of polyvinylidene fluoride, followed by mixing to obtain a slurry, which was coated on each side of an aluminum foil having a thickness of 20 μm and having the surface roughened, followed by drying at 180° C., roll pressing and then slitting to obtain two electrode sheets having a width of 100 mm, a length of 4200 mm and a thickness of 100 μm.

Using the two electrode sheets as a positive electrode and a negative electrode, respectively, and eight aluminum leads having a width of 5 mm, a thickness of 150 μm and a length of 45 mm were bonded, respectively, and they were wound with a separator made of rayon and having a thickness of 55 μm, interposed. The positive electrode leads and the negative electrode leads were respectively bundled eight leads each and bonded by ultrasonic wave welding to the positive electrode terminal and the negative electrode terminal, respectively, attached to a circular top cover made of a phenol resin, to obtain an element.

This element was vacuum-dried at 180° C. for 16 hours to remove volatile impurities. Thereafter, an electrolyte of a propylene carbonate solution containing 1.5 mol/l of $(C_2H_5)_3(CH_3)NBF_4$ as an electrolyte, was vacuum-impregnated to this element in a dry air atmosphere at 50° C. Then, across the positive electrode terminal and the negative electrode terminal of this element, a DC voltage of 2.65 V was applied for 20 hours at 70° C.

This element was accommodated in a cylindrical aluminum container having a height of 123 mm and a diameter of 51 mm, and a top cover was fit in an opening of the aluminum container via a rubber ring, and the upper portion of the aluminum container was folded for sealing. A vacuum pump was attached at a small perforation at which an explosion-proof valve was to be attached, and the interior of the container was brought to a reduced pressure of 1 mmHg and maintained under such a condition for 1 hour. Then, the interior of the container was returned to the atmospheric pressure by dry nitrogen to obtain a cylindrical terminal type electric double layer capacitor having a capacitance of 1750 F and a rated voltage of 2.5 V, which was evaluated in the same manner as in Example 1. The capacitance-holding ratio was 83%. No deformation due to swelling was observed with the aluminum container.

EXAMPLE 3

In the same manner as in Example 1 except that no application of a voltage was carried out prior to sealing the container, an element impregnated with the electrolyte was maintained under a reduced pressure of 0.5 mmHg, and the container was sealed under such a reduced pressure condition to obtain an angular electric double layer capacitor having a capacitance of 2500 F. To compare with Example 1, the same voltage (2.5 V) as in Example 1 was applied, and evaluation was carried out in the same manner as in Example 1. After 2000 hours, the capacitance-holding ratio was already 15%, and no further evaluation was continued. After 2000 hours, a deformation due to swelling of the aluminum container was observed, and at the center portion of the container, the thickness was found to have increased by 9 mm at the maximum

EXAMPLE 4

An angular electric double layer capacitor having a capacitance of 2500 F and a rated voltage of 2.5 V was prepared in the same manner as in Example 1 except that application of the voltage prior to sealing of the container was carried out at 2.3 V, and it was evaluated in the same manner as in Example 1. The capacitance-holding ratio was 71%. A deformation due to swelling was observed with the aluminum container, and at the center portion of the container, the thickness was found to have increased by 3 mm at the maximum.

EXAMPLE 5

An electric double layer capacitor was prepared in the same manner as in Example 1 except that after the preliminary application of a voltage, the interior of the aluminum container was not brought to a reduced pressure condition, and it was evaluated in the same manner as in Example 1. The capacitance-holding ratio was 85%. With the aluminum container after applying a voltage of 2.5 V for 3000 hours at 60° C., a deformation due to swelling was observed, and at the center portion of the container, the thickness was found to have increased by 2 mm at the maximum.

EXAMPLE 6

An electric double layer capacitor was prepared in the same manner as in Example 2 except that after the preliminary application of a voltage, the interior of the aluminum container was not brought to a reduced pressure condition, and it was evaluated in the same manner as in Example 2. The capacitance-holding ratio was 80%. A deformation due to swelling in the bottom direction of the aluminum container was observed, and at the center portion of the bottom, the thickness was found to have increased by 1 mm.

According to the present invention, an electric double layer capacitor can be obtained which is a large capacitance electric double layer capacitor having a high withstand voltage, a large capacitance, a high energy density, a good voltage-holding property and a small decrease with time of the capacitance after charging, and whereby the cell is scarcely deformable even when used for a long period of time.

What is claimed is:

1. A process for producing a large capacitance electric double layer capacitor, which comprises a step of:
forming an element by disposing a positive electrode and a negative electrode containing a carbon material having a specific surface area of at feast 500 $m^2/g$ to face each other with a separator interposed and then vacuum-drying the element at a high temperature;
accommodating the element in a metal container;
impregnating the element with a non-aqueous electrolyte and then applying a voltage in the range of 1 to 1.5 times the rated voltage across the positive electrode and the negative electrode;
maintaining the element in the container, for a determined period of time, under a reduced pressure for purging at least a gas produced;
injecting an inert gas in the container to bring the pressure back to the atmospheric pressure; and
sealing the metal container.

2. The process for producing a large capacitance electric double layer capacitor according to claim 1, wherein the metal container is sealed while the internal pressure is adjusted to be the atmospheric pressure.

3. The process for producing a large capacitance electric double layer capacitor according to claim 2, wherein the positive electrode and the negative electrode are formed on metal current collectors made of an aluminum foil, the rated voltage is from 2.5 to 3.3 V, and the applied voltage is from 2.5 to 3.5 V.

4. The process for producing a large capacitance electric double layer capacitor according to claim 2, wherein the applied voltage is applied at an ambient temperature of from 35 to 85° C.

5. The process for producing a large capacitance electric double layer capacitor according to claim 2, wherein the element is maintained under a reduced pressure of at most 160 mmHg.

6. The process for producing a large capacitance electric double layer capacitor according to claim 2, wherein the element is maintained under a reduced pressure after it is accommodated in the metal container.

7. The process for producing a large capacitance electric double layer capacitor according to claim 6, wherein the element is subjected to the application of the applied voltage after it is accommodated in the metal container.

8. The process for producing a large capacitance electric double layer capacitor according to claim 2, wherein the solvent of the non-aqueous electrolyte is at least one solvent selected from the group consisting of propylene carbonate, ethylene carbonate, butylene carbonate, diethyl carbonate, dimethyl carbonate, ethylmethyl carbonate, 1,2-dimethoxyethane, sulfolane and methyl sulfolane.

9. The process for producing a large capacitance electric double layer capacitor according to claim 2, wherein the non-aqueous electrolyte contains a salt having a quaternary ammonium ion of the formula $R^1R^2R^3R^4N^+$ or a quaternary phosphonium ion of the formula $R^1R^2R^3R^4P^+$ (wherein each of $R^1$, $R^2$, $R^3$ and $R^4$ which are independent of one another, is a $C_{1-4}$ alkyl group) combined with an anion of $BF_4^-$, $N(CF_3SO_2)_2^-$, $PF_6^-$ or $ClO_4^-$.

10. The process for producing a large capacitance electric double layer capacitor according to claim 1 wherein the positive electrode and the negative electrode are formed on metal current collectors made of an aluminum foil, the rated voltage is from 2.5 to 3.3 V, and the applied voltage is from 2.5 to 3.5 V.

11. The process for producing a large capacitance electric double layer capacitor according to claim 1, wherein the applied voltage is applied at an ambient temperature of from 35 to 85° C.

12. The process for producing a large capacitance electric double layer capacitor according to claim 1, wherein the element is maintained under a reduce pressure of at most 160 mmHg.

13. The process for producing a large capacitance electric double layer capacitor according to claim 1, wherein the element is maintained under a reduced pressure after it is accommodated in the metal container.

14. The process for producing a large capacitance electric double layer capacitor according to claim 13, wherein the element is subjected to the application of the applied voltage after it is accommodated in the metal container.

15. The process for producing a large capacitance electric double layer capacitor according to claim 1, wherein the solvent of the non-aqueous electrolyte is at least one solvent selected from the group consisting of propylene carbonate, ethylene carbonate, butylene carbonate, diethyl carbonate, dimethyl carbonate, ethylmethyl carbonate, 1,2-dimethoxyethane, sulfolane and methyl sulfolane.

16. The process for producing a large capacitance electric double layer capacitor according to claim 1, wherein the non-aqueous electrolyte contains a salt having a quaternary ammonium ion of the formula $R^1R^2R^3R^4N^+$ or a quaternary phosphonium ion of the formula $R^1R^2R^3R^4P^+$ (wherein each of $R^1$, $R^2$, $R^3$ and $R^4$ which are independent of one another, is a $C_{1-4}$ alkyl group) combined with an anion of $BF_4^-$, $N(CF_3SO_2)_2^-$, $PF_6^-$ or $ClO_4^-$.

17. The process for producing a large capacitance electric double layer capacitor according to claim 1, wherein the element is maintained under a reduced pressure after applying the applied voltage of from 1 to 1.5 times the rated voltage across the positive electrode and the negative electrode.

18. The process for producing a large capacitance electric double layer capacitor according to claim 17, wherein the metal container is sealed while the internal pressure is adjusted to be the atmospheric pressure.

19. The process for producing a large capacitance electric double layer capacitor according to claim 18, wherein the positive electrode and the negative electrode are formed on metal current collectors made of an aluminum foil, the rated voltage is from 2.5 to 3.3 V, and the applied voltage is from 2.5 to 3.5 V.

20. The process for producing a large capacitance electric double layer capacitor according to claim 18, wherein the applied voltage is applied at an ambient temperature of from 35 to 85° C.

21. The process for producing a large capacitance electric double layer capacitor according to claim 18, wherein the element is maintained under a reduced pressure of at most 160 mmHg.

22. The process for producing a large capacitance electric double layer capacitor according to claim 18, wherein the element is maintained under a reduced pressure after it is accommodated in the metal container.

23. The process for producing a large capacitance electric double layer capacitor according to claim 22, wherein the element is subjected to the application of the applied voltage after it is accommodated in the metal container.

24. The process for producing a large capacitance electric double layer capacitor according to claim 10, wherein the positive electrode and the negative electrode are formed on metal current collectors made of an aluminum foil, the rated voltage is from 2.5 to 3.3 V, and the applied voltage is from 2.5 to 3.5 V.

25. The process for producing a large capacitance electric double layer capacitor according to claim 17, wherein the applied voltage is applied at an ambient temperature of from 35 to 85° C.

26. The process for producing a large capacitance electric double layer capacitor according to claim 17, wherein the element is maintained under a reduced pressure of at most 160 mmHg.

27. The process for producing a large capacitance electric double layer capacitor according to claim 17, wherein the element is maintained under a reduced pressure after it is accommodated in the metal container.

28. The process for producing a large capacitance electric double layer capacitor according to claim 27, wherein the element is subjected to the application of the applied voltage after it is accommodated in the metal container.

29. The process for producing a large capacitance electric double layer capacitor according to claim 17, wherein the solvent of the non-aqueous electrolyte is at least one solvent selected from the group consisting of propylene carbonate, ethylene carbonate, butylene carbonate, diethyl carbonate, dimethyl carbonate, ethylmethyl carbonate, 1,2-dimethoxyethane, sulfolane and methyl sulfolane.

30. The process for producing a large capacitance electric double layer according to claim 17, wherein the non-aqueous electrolyte contains a salt having a quaternary ammonium ion of the formula $R^1R^2R^3R^4N^+$ or a quaternary phosphonium ion of the formula $R^1R^2R^3R^4P^+$ (wherein each of $R^1$, $R^2$, $R^3$ and $R^4$ which are independent of one another, is a $C_{1-4}$ alkyl group) combined with an anion of $BF_4^-$, $N(CF_3SO_2)_2^-$, $PF_6^-$ or $ClO_4^-$.

31. The process for producing a large capacitance electric double layer capacitor according to claim 1, wherein the element is maintained under a reduced pressure while applying an applied voltage of from 1 to 1.5 times the rated voltage across the positive electrode and the negative electrode.

32. The process for producing a large capacitance electric double layer capacitor according to claim 31, wherein the metal container is sealed while the internal pressure is adjusted to be the atmospheric pressure.

33. The process for producing a large capacitance electric double layer capacitor according to claim 31, wherein the positive electrode and the negative electrode are formed on metal current collectors made of an aluminum foil, the rated voltage is from 2.5 to 3.3 V, and the applied voltage is from 2.5 to 3.5 V.

34. The process for producing a large capacitance electric double layer capacitor according to claim 31, wherein the applied voltage is applied at an ambient temperature of from 35 to 85° C.

35. The process for producing a large capacitance electric double layer capacitor according to claim 31, wherein the element is maintained under a reduced pressure of at most 160 mmHg.

36. The process for producing a large capacitance electric double layer capacitor according to claim 31, wherein the element is maintained under a reduced pressure after it is accommodated in the metal container.

* * * * *